(12) United States Patent
Schlipf et al.

(10) Patent No.: US 12,539,959 B2
(45) Date of Patent: Feb. 3, 2026

(54) WING FOR AN AIRCRAFT WITH A SLAT ASSEMBLY

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/985,396

(22) Filed: Dec. 18, 2024

(65) Prior Publication Data
US 2025/0206437 A1 Jun. 26, 2025

(30) Foreign Application Priority Data
Dec. 20, 2023 (EP) ..................................... 23218575

(51) Int. Cl.
*B64C 9/22* (2006.01)
(52) U.S. Cl.
CPC ..................................... *B64C 9/22* (2013.01)
(58) Field of Classification Search
CPC ..................................... B64C 9/08; B64C 9/22
See application file for complete search history.

(56) References Cited

U.S. PATENT DOCUMENTS

| | | | |
|---|---|---|---|
| 2,405,726 A * | 8/1946 | Zap | ........................... B64C 9/16 244/216 |
| 4,399,970 A | 8/1983 | Evans | |
| 4,437,631 A | 3/1984 | Martens et al. | |
| 7,293,744 B2 * | 11/2007 | Perez-Sanchez | ......... B64C 9/22 244/211 |
| 2022/0388629 A1 * | 12/2022 | Schlipf | ..................... B64C 9/02 |
| 2023/0026241 A1 | 1/2023 | Edmunds et al. | |

FOREIGN PATENT DOCUMENTS

EP 4101754 A1 12/2022

OTHER PUBLICATIONS

European Search Report for corresponding European Patent Application No. 23218575.1 dated Jun. 11, 2024.

* cited by examiner

*Primary Examiner* — Richard Green
(74) *Attorney, Agent, or Firm* — Greer, Burns & Crain, Ltd.

(57) ABSTRACT

A wing for an aircraft, including a main wing and a slat assembly including a slat and at least one connection assembly movably connecting the slat to the main wing, such that the slat is movable between a retracted position and at least one extended position, such that the connection assembly has an elongate slat track, and the front end of the slat track is mounted to the slat, such that the rear end and/or the intermediate portion of the slat track are mounted to the main wing by a roller or slide bearing such that the slat track is movable along the track longitudinal axis, such that the connection assembly has a drive unit configured for driving the slat track, such that the drive unit includes a rotary actuator having at least one drive arm rotatably driven about a rotation axis and drivingly engaging the slat track.

18 Claims, 8 Drawing Sheets

WING FOR AN AIRCRAFT WITH A SLAT ASSEMBLY

CROSS-REFERENCES TO RELATED APPLICATIONS

This application claims the benefit of European Patent Application Number 23218575.1 filed on Dec. 20, 2023, the entire disclosure of which is incorporated herein by way of reference.

FIELD OF THE INVENTION

The present invention relates to a wing for an aircraft, comprising a main wing and a slat assembly. Further aspects of the invention relate to a slat assembly for such a wing, as well as to an aircraft comprising such a wing and/or comprising such a slat assembly.

The slat assembly comprises a slat and at least one connection assembly movably connecting the slat to the main wing, such that the slat can be moved relative to the main wing between a retracted position and at least one extended position.

The connection assembly comprises an elongate slat track that might be curved or straight and that extends along a track longitudinal axis between a front end and a rear end and has an intermediate portion between the front and rear ends. The front end of the slat track is preferably fixedly mounted to the slat, e.g., by two spherical bearings, both arranged with an offset in a wing profile plane across a wing span direction. The rear end and/or the intermediate portion of the slat track are movably mounted to or supported at the main wing by a roller or slide bearing such that the slat track is movable along the track longitudinal axis, i.e. along a predefined path, preferably a circular path. The roller or slide bearing can include rollers and/or slide surfaces.

Further, the connection assembly comprises a drive unit mounted to the main wing and configured for driving the slat track for movement along the track longitudinal axis and along the predetermined path to move the slat between the retracted and extended positions. The drive unit comprises a rotary actuator mounted to the main wing, preferably fixedly and directly mounted to the main wing, and having at least one preferably elongate drive arm, preferably in the form of a crank arm, rotatably driven about a rotation axis that is preferably fixed at the main wing, and drivingly engaging the slat track. The drive arm is rotatingly driven preferably by a geared rotary actuator (GRA). One of the drive arm and the slat track comprises at least one groove, preferably in the form of an elongate slot or a long hole, and the other one of the drive arm and the slat track comprises at least one spigot, such as a pin, drivingly engaging the groove and preferably extending in parallel to the rotation axis. Preferably, the drive arm comprises the groove and the slat track comprises the spigot.

The groove defines an inner end position and an outer end position between which the spigot can move in a guided manner when the drive arm is rotated about the rotation axis. The inner end position and/or the outer end position might be defined by a hard stop, such as a closed end or a stopper, limiting travel of the spigot mechanically. Alternatively, the inner end position and the outer end position might not be defined by any hard stop but might simply relate to the ends of the travel path of the spigot within the groove. In particular, the inner end position might be defined by a hard stop in the form of end closed end of the groove, while the outer end position might be defined by an end of the travel path of the spigot within the groove, e.g., at the level of the opening of the groove, i.e., the end of the lateral guide, without the groove having any hard stop. Also, it might be possible that even when there is a hard stop, such as a closed end of the groove, the inner and/or outer end is not defined by the hard stop as the travel path of the spigot within the groove ends before the hard stop. The groove defines a center line which extends from the inner end position to the outer end position and along which the spigot moves between the inner and outer end positions.

BACKGROUND OF THE INVENTION

Similar wings are known in the art. Some known wings employ a rack-and-pinion drive for driving the slat, wherein a drive pinion engages a rack provided at the slat track. Such rack-and-pinion drives are considerably complex and expensive.

EP 4,101,754 A1 describes a wing as known in the art.

SUMMARY OF THE INVENTION

The object of the present invention is to provide a wing employing a simple, robust, and cost-efficient drive unit having a very smooth and efficient load transfer.

This object is achieved in that the groove has a curved form, wherein a distance between the center line and the rotation axis increases, preferably continuously increases, from the inner end position towards the outer end position. In such a way, a very smooth and efficient load transmission from the drive arm to the slat track is achieved. Further, compared to a traditional rack-and-pinion drive, the solution according to the invention relates to a very simple, robust, and cost-efficient drive unit, since no high precision gear teeth are involved and assembly tolerances are rather low compared to a rack-and-pinion drive. Also, maintenance efforts can be essentially reduced. Further, different positions of the drive arm are possible and a dual load path design with two drive arms is enabled.

According to a preferred embodiment, the groove has such a form that a distance between the center line and a first reference line increases, preferably increases continuously and/or overproportionately, from the inner end position towards the outer end position, the first reference line having a straight radial extension from the rotation axis and intersecting the inner end position of the groove. In such a way, a very smooth and efficient load transfer is achieved.

According to a further preferred embodiment, an angle $\alpha$ between the first reference line and a tangent to the center line at the inner end position is between −30° and 45°, preferably between −10° and 20°, more preferred between −5° and 5° most preferred around 0°. In such a way, a very smooth and efficient load transfer is achieved.

According to a further preferred embodiment, an angle $\beta$ between a second reference line and a tangent to the center line at the outer end position is between 45° and 90°, preferably between 30° and 70°, more preferred between 55° and 65°, most preferred around 60°, the second reference line having a straight radial extension from the rotation axis and intersecting the outer end position of the groove. In such a way, a very smooth and efficient load transfer is achieved.

According to a further preferred embodiment, an angle $\gamma$ between the first reference line and the second reference line is between 20° and 90°, preferably between 30° and 70°, more preferred between 40° and 50°, most preferred around 45°. In such a way, a very smooth and efficient load transfer is achieved.

According to a further preferred embodiment, the groove has a convexly curved form with respect to the slat. In this case, the spigot preferably moves (mainly) from the inner end position towards the outer end position, when the drive arm drives the slat track to move the slat from the retracted position towards the extended position. However, this does not necessarily mean that the spigot is at the inner end position when the slat is in the retracted position and that the spigot is at the outer end position when the slat is in the extended position. Rather, it might also be possible and preferred that the spigot after reaching the outer end position moves back towards the inner end position to some preferably limited extent, before the slat has reached the extended position. Similar might apply with respect to the retracted position of the slat. This relates to one possible design to achieve a very smooth and efficient load transfer.

According to an alternative preferred embodiment, the groove has a concavely curved form with respect to the slat. In this case, the spigot preferably moves (mainly) from the outer end position towards the inner end position, when the drive arm drives the slat track to move the slat from the retracted position towards the extended position. However, this does not necessarily mean that the spigot is at the outer end position when the slat is in the retracted position and that the spigot is at the inner end position when the slat is in the extended position, in any case. Rather, it might also be possible and preferred in some cases that the spigot after reaching the inner end position moves back towards the outer end position to some preferably limited extent, before the slat has reached the extended position. Similar might apply with respect to the retracted position of the slat. This relates to another possible design to achieve a very smooth and efficient load transfer.

According to a further preferred embodiment, the groove has one or more locking positions, for the spigot to be temporarily locked, where the curvature essentially differs from the other areas of the groove. In such a way, temporary fixing of the drive arm vis-à-vis the slat track at certain positions is enabled.

In particular, it is preferred that a locking position is formed at the inner end position and/or at the outer end position. In such a way, a temporary fixing of the drive arm vis-à-vis the slat track at the end positions is enabled.

According to a further preferred embodiment, the spigot comprises a spigot roller for rolling engagement with the slot, in particular with the surface of the drive arm surrounding the slot. Preferably, the spigot roller has an axis of rotation aligned with the spigot axis of extension. By such a spigot roller, a smooth and low friction engagement between the spigot and the groove is achieved.

According to a further preferred embodiment, the spigot or the groove is provided at a lateral side of the slat track preferably at the intermediate portion of slat track. Preferably, the groove is formed in the drive arm and the spigot extends from the lateral surface of slat track. This relates to a very simple and robust design.

According to a preferred embodiment, the groove is open at an outer end, i.e. a distal end, of the drive arm. In such a way, the spigot can be more easily inserted into the groove, which largely simplifies assembly of the slat assembly.

According to a further preferred embodiment, the slat track, when moved along the track longitudinal axis between retracted and extended positions of the slat, is movable along a straight path, preferably in case of a straight slat track, or is movable along a curved path, preferably in case of a curved slat track, having an axis of rotation, i.e., a center of rotation about which the slat track is moved, spaced from the rotation axis of the drive arm, preferably spaced in parallel from the rotation axis. The axes of rotation of the drive arm and the slat track not being coaxial is the reason why the groove is employed. This allows essential freedom of design to optimize the drive unit.

According to a preferred embodiment, the one of the drive arm and the slat track comprising the at least one groove comprises two grooves, and the other one of the drive arm and the slat track comprising the at least one spigot comprises two spigots drivingly engaging the two grooves. Preferably, the drive arm comprises two grooves and the slat track comprises two spigots drivingly engaging the two grooves. Employing two grooves and two spigots enables a more efficient load transfer from the drive arm to the slat track for a longer path of the movement of the slat track.

According to a preferred embodiment, the drive arm is a first drive arm and the rotary actuator comprises a second drive arm, preferably in the form of a crank arm, rotatably driven about the rotation axis and drivingly engaging the slat track. By such a second drive arm a second load path can be realized to achieve redundant load paths.

According to a preferred embodiment, the roller or slide bearing comprises a guide rail fixedly mounted to the main wing and a first roller unit mounted to the rear end of the slat track and engaging the guide rail. Preferably, the guide rail is formed, e.g., by a c-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. In other words, the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Further preferably, the first roller unit has a first axis of rotation extending in parallel to a wing span direction, to a leading edge of main wing, or to a leading edge of the slat.

In particular, it is preferred that the roller or slide bearing comprises a second roller unit that is fixedly mounted to the main wing and that engages an engagement surface provided at the intermediate portion of the slat track. Preferably, the second roller unit has a second axis of rotation extending in parallel to the wing span direction, to the leading edge of the main wing, or to the leading edge of the slat.

It is further preferred that the slat track has a profile, i.e., a cross section across the longitudinal axis, comprising an upper flange portion, a lower flange portion and at least one web portion connecting upper and lower flange portions. Such a profile might be e.g., a C-profile, a double-C-profile, an I-profile, an H-profile, or a II-profile. The second roller unit is arranged in a recess between upper and lower flange portions and engages the engagement surface provided at the upper flange portion and/or at the lower flange portion, preferably either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

According to a preferred embodiment, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

In particular, it is preferred that the second roller unit comprises a first roller element and a second roller element. The first roller element is arranged in the first recess and the second roller element is arranged in the second recess. First and second roller elements are arranged coaxially, i.e., both rotating about the second axis of rotation, and have the same radius. By the first and second roller element higher loads can be absorbed and a symmetric arrangement or an arrangement with two separate load paths is enabled.

In particular, it is preferred that the groove or the spigot is arranged in the web portion. Preferably, the spigot is received in a corresponding bore in the web portion and projects away from the web portion from one side or from both opposite sides. This relates to a particularly simple and robust design.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g., by bolts, and rest against one another along a contact plane spanned by the track longitudinal axis and a wing thickness direction, which might be a vertical symmetry plane, preferably along the entire longitudinal extension. Preferably, the first and second track parts each have a C-shaped profile which are preferably arranged back-to-back, so that both track parts together have a double-C-shaped profile. By the first and second track part two separate load paths are introduced which might be designed as redundant load paths such that when one load path fails the other load path is still capable of carrying the occurring air loads applied via the slat.

In particular, it is preferred that the cross-section across the track longitudinal axis of the slat track is formed such that a predefined gap is formed between a portion of the first track part, preferably a lower portion of the first track part, and a portion of the second track part, preferably a lower portion of the second track part, in extension of the contact plane. The spigot or the groove is arranged in the web portion of the first and second track parts on opposite sides of the gap. The drive arm extends inside the gap to engage with the slat track, preferably to engage the spigot or the groove arranged in the web portion by the respective other of the spigot and the groove arranged in the drive arm. This relates to a particularly compact and robust design with redundant load paths.

According to a preferred embodiment, the connection assembly is a first connection assembly. The wing comprises a second connection assembly connecting the slat to the main wing in a position spaced apart from the first connection assembly in a wing span direction. The second connection assembly is formed as the first connection assembly, i.e., has the same features as the first connection assembly. Alternatively, the second connections assembly might also be formed different from the first connection assembly.

A further aspect of the invention relates to a slat assembly for the wing according to any of the above described embodiment. The slat assembly comprises a slat, and at least one connection assembly for movably connecting the slat to a main wing for an aircraft. The connection assembly comprises an elongate slat track that extends along a track longitudinal axis between a front end and a rear end and has an intermediate portion between the front and rear ends. The front end of the slat track is configured to be mounted to the slat. The rear end and/or the intermediate portion of the slat track are configured to be mounted to the main wing by a roller or slide bearing such that the slat track is movable along the track longitudinal axis. The connection assembly comprises a drive unit configured to be mounted to the main wing and configured for driving the slat track for movement along the track longitudinal axis along a predefined path between retracted and extended positions of the slat. The drive unit comprises a rotary actuator mounted to the main wing and having at least one drive arm rotatably driven about a rotation axis and drivingly engaging the slat track. One of the drive arm and the slat track comprises at least one groove and the other one of the drive arm and the slat track comprises at least one spigot drivingly engaging the groove. The groove defines an inner end position and an outer end position between which the spigot can move in a guided manner when the drive arm is rotated about the rotation axis. The groove defines a center line extending from the inner end position to the outer end position. The groove has a curved form, wherein a distance between the center line and the rotation axis increases from the inner end position towards the outer end position. The features and effects described above in connection with the wing apply vis-à-vis also in case of the slat assembly.

BRIEF DESCRIPTION OF THE DRAWINGS

A further aspect of the invention relates to an aircraft comprising a wing according to any of the above described embodiments and/or comprising a slat assembly according to any of the above described embodiments. The features and effects described above in connection with the wing or the slat assembly apply vis-à-vis also in case of the aircraft.

Hereinafter, preferred embodiments of the present invention are explained in more detail by means of a drawing.

DETAILED DESCRIPTION OF THE PREFERRED EMBODIMENTS

Figure 1:
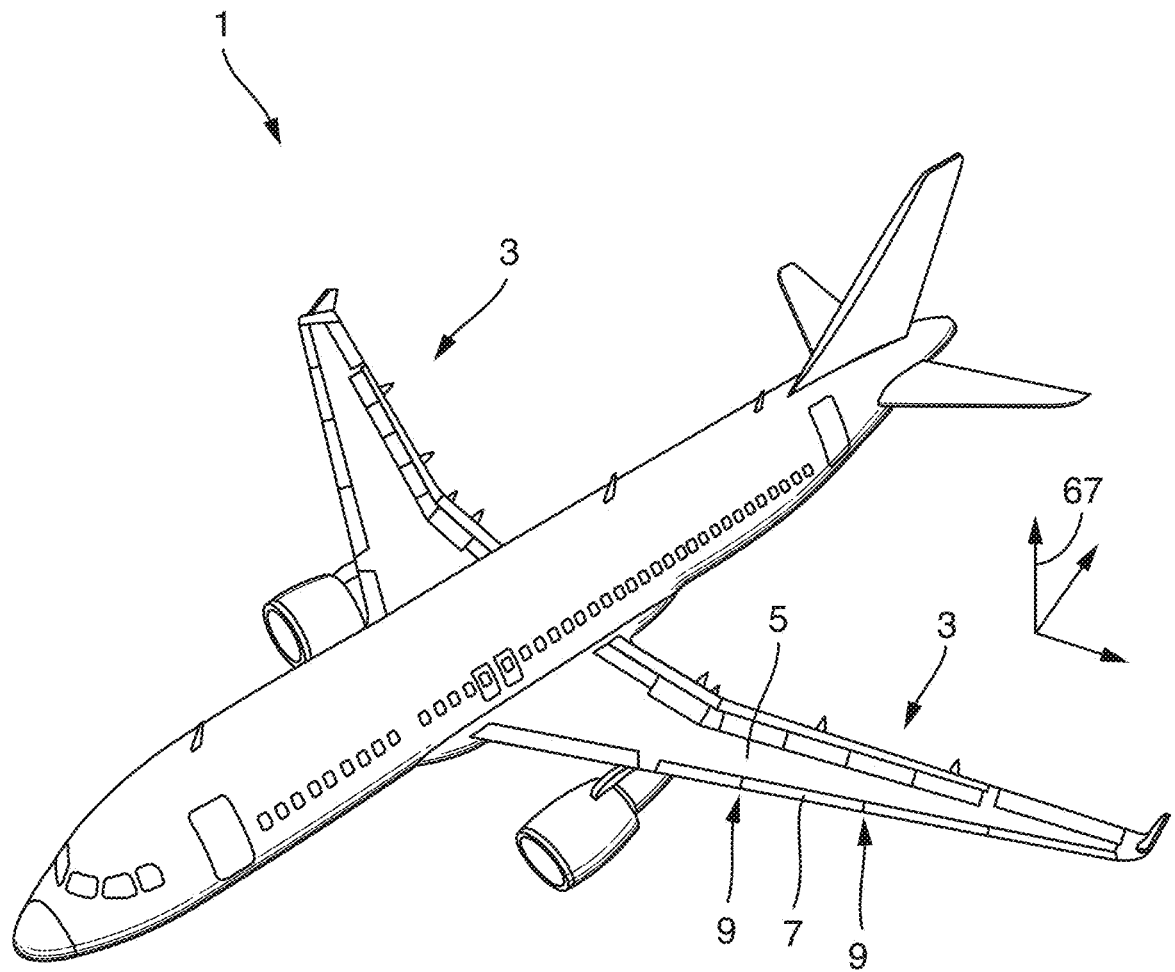
FIG. 1 is a perspective view of an aircraft according to the present invention, including a wing.

In FIG. 1 an aircraft 1 according to an embodiment of the present invention is illustrated. The aircraft 1 comprises a wing 3 that is formed according to an embodiment of the present invention. The 3 wing comprises a main wing 5 and a slat assembly 6.

Figure 2:
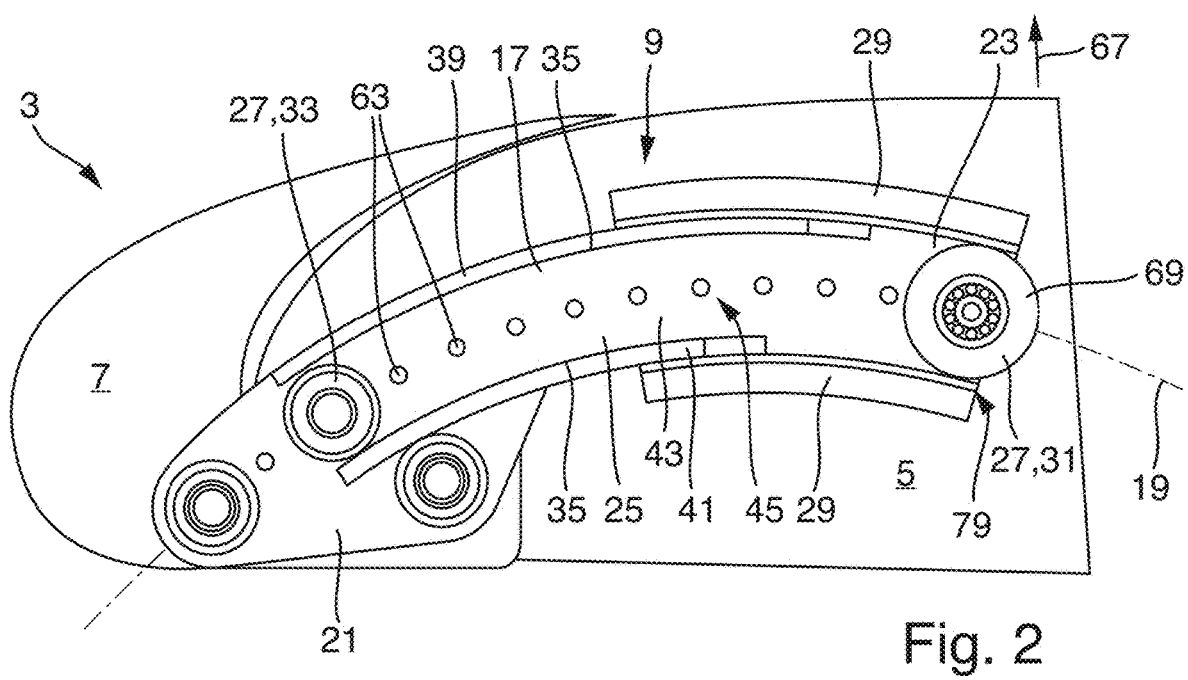
FIG. 2 is a cross sectional view of the wing shown in FIG. 1, including a connection assembly.

FIG. 2 shows the wing 3 from FIG. 1 in more detail. The wing 3 comprises the main wing 5 and the slat assembly 6, the slat assembly 6 comprising a slat 7 and a connection assembly 9 movable connecting the slat 7 to the main wing 5, such that the slat 7 is movable between a retracted position 11 and at least one extended position 13.

Figure 3:
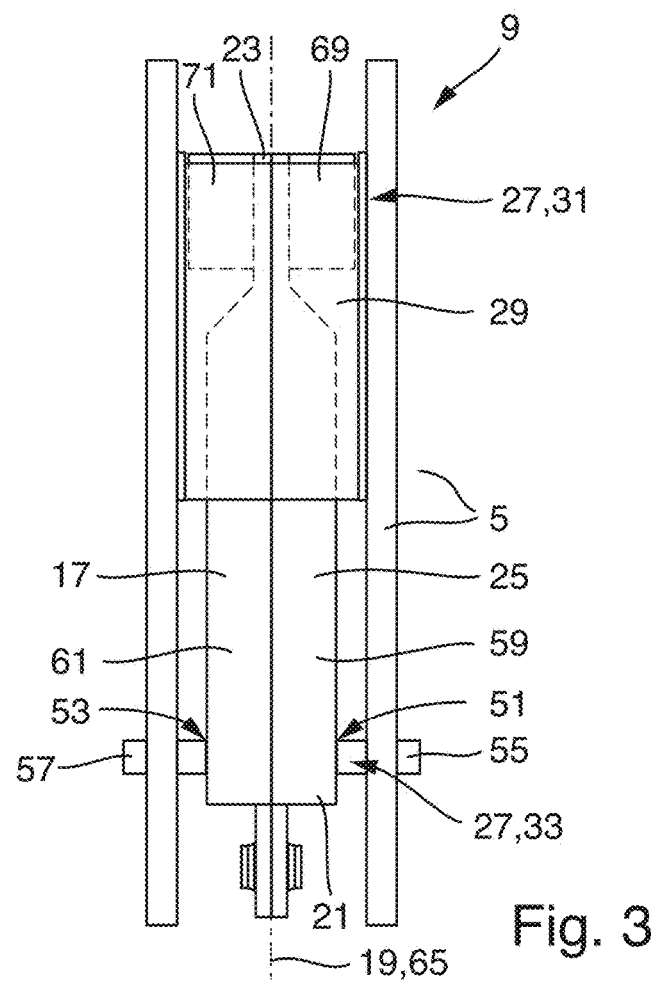
FIG. 3 is a top view of the connection assembly shown in FIG. 2.
Figure 4:
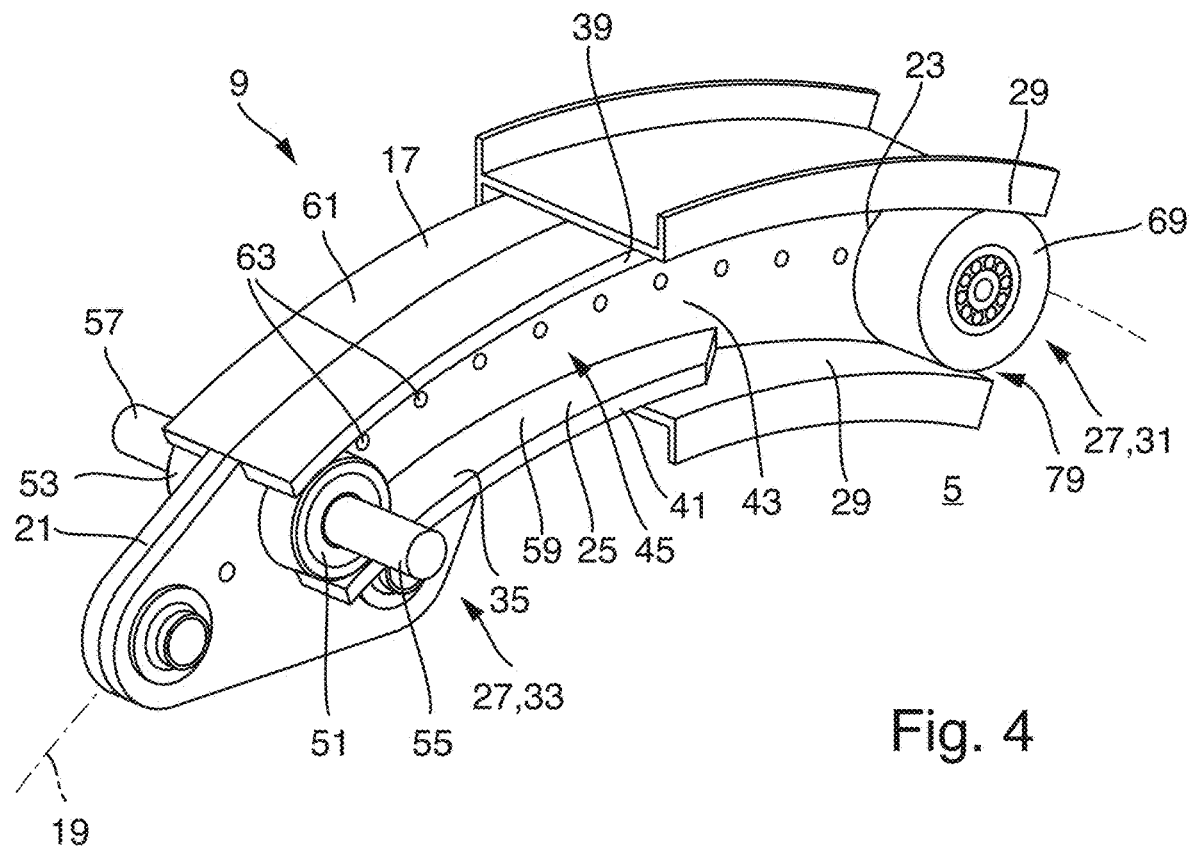
FIG. 4 is a perspective view of the connection assembly shown in FIG. 2.
Figure 5:
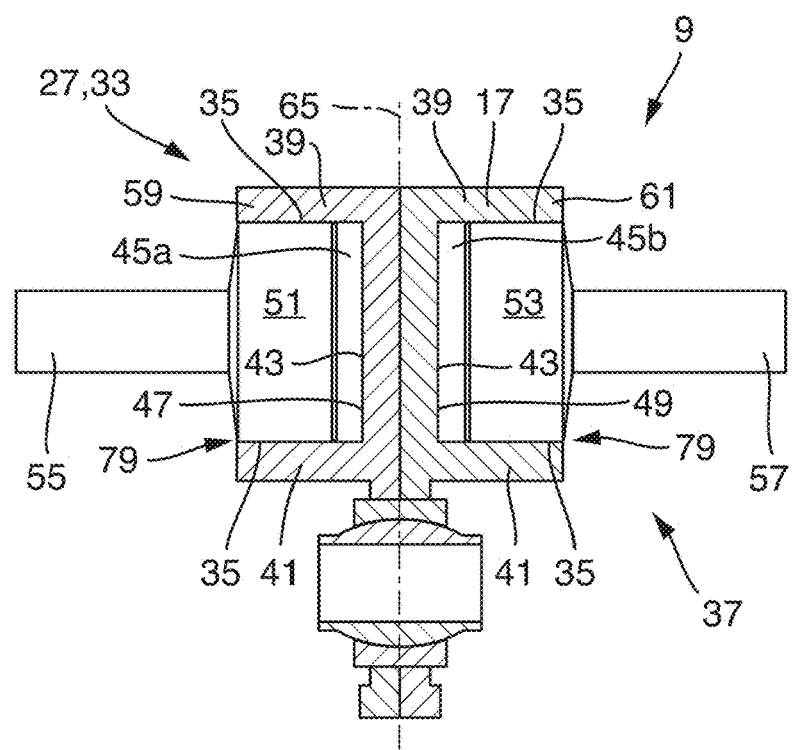
FIG. 5 is a cross sectional view across the track longitudinal axis of the connection assembly shown in FIG. 2.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller or slide bearing 27 such that the slat track 17 is movable along the track longitudinal axis 19. The roller or slide bearing 27 comprises a guide rail 29 fixedly mounted to the main wing 5 and a first roller unit 31 fixedly mounted to the rear end 23 of the slat track 17 and engaging the guide rail 29. The roller or slide bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

Figure 6:
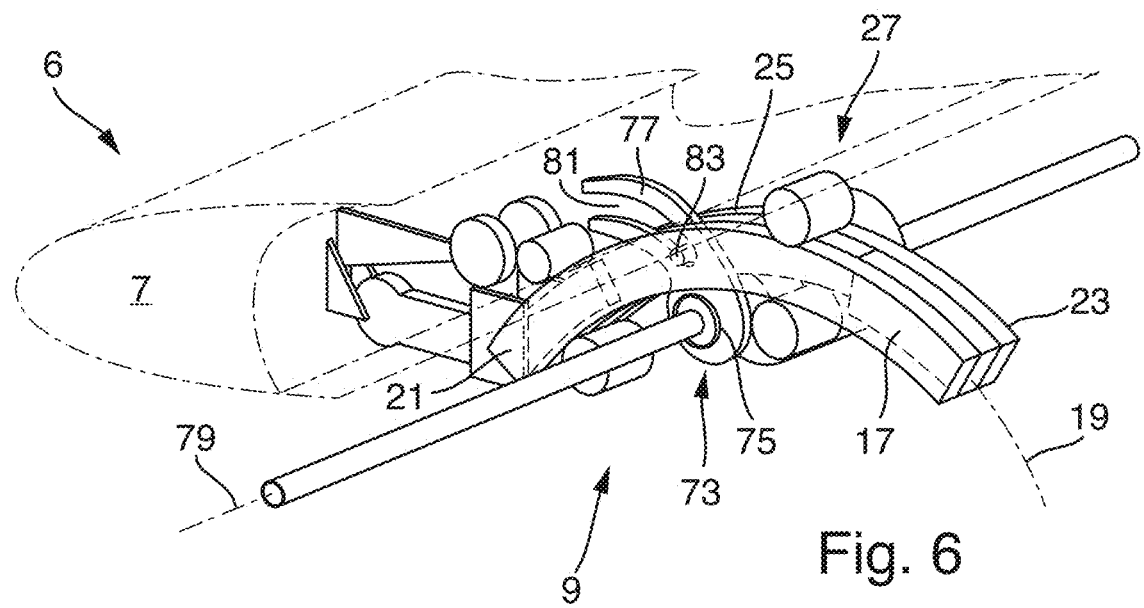
FIG. 6 is a schematic perspective view of a slat assembly according to an embodiment of the present invention.
Figure 7A:
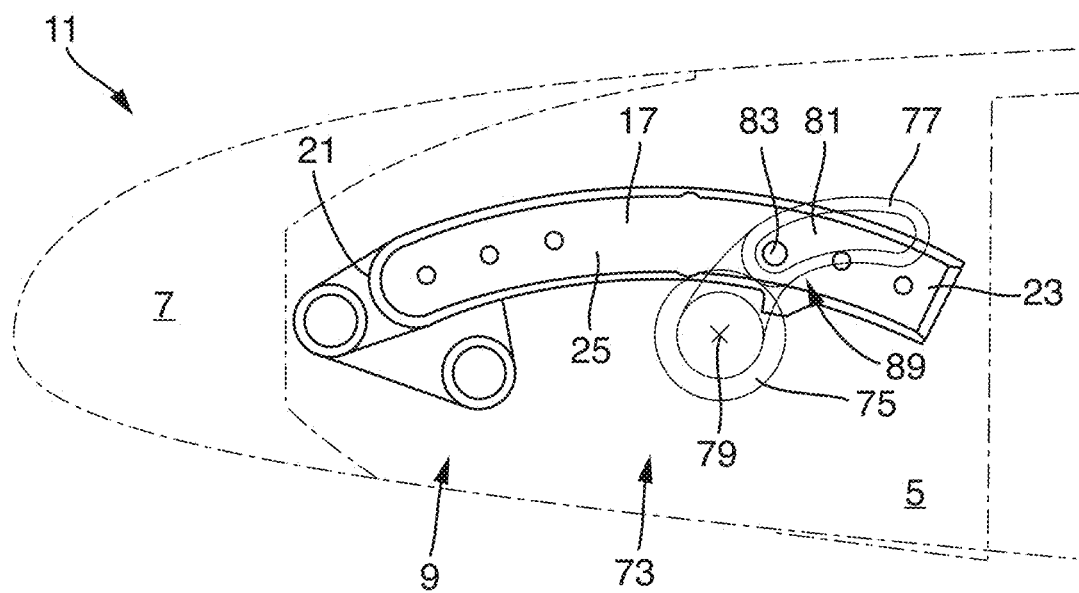
FIG. 7a is a schematic side view of a connection assembly according to another embodiment of the invention, illustrating a first stage of actuation.
Figure 7B:
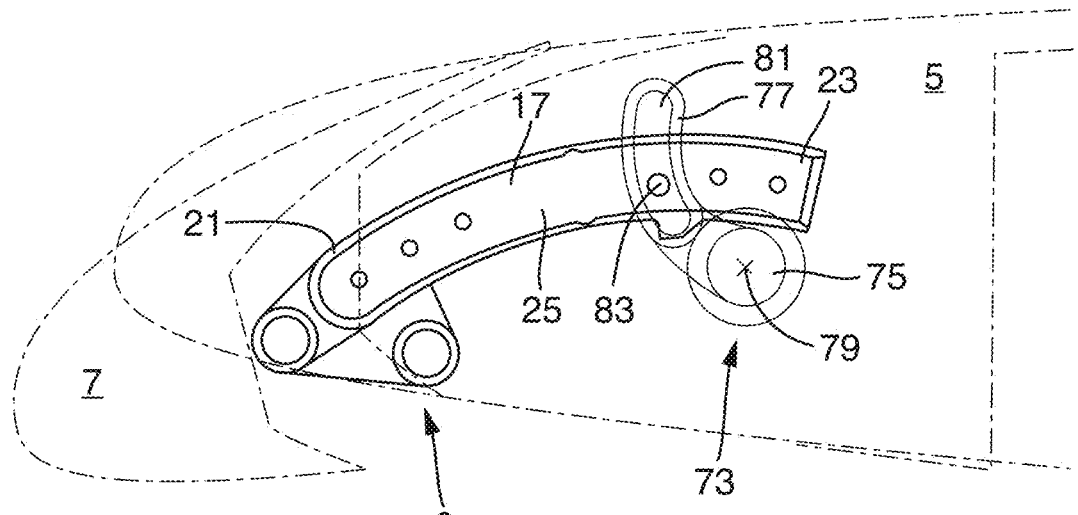
FIG. 7b is a schematic side view of the connection assembly according to the embodiment of FIG. 7a, illustrating a second stage of actuation.
Figure 7C:
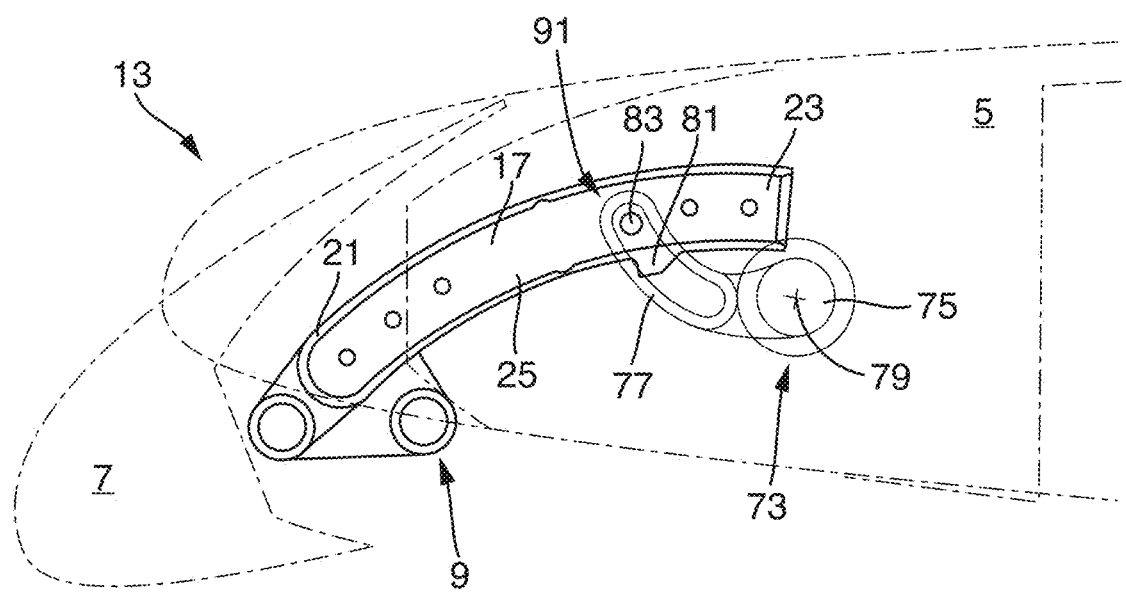
FIG. 7c is a schematic side view of the connection assembly according to the embodiment of FIG. 7a, illustrating a third stage of actuation.

FIG. 6 shows a slat assembly 6 for an aircraft 1 as shown in FIG. 1. The slat assembly 6 comprises a connection assembly 9 as described before in connection with FIGS. 2-5. FIGS. 7 to 12 show different embodiments of connection assemblies 9 that might be used in connection with the slat assembly 6 of FIG. 6.

All embodiments shown in FIGS. 6 to 12 have in common that the connection assembly 9 comprises a drive unit 73 mounted to the main wing 5 and configured for driving the slat track 17 for movement along the track longitudinal axis 19 and along the predetermined path to move the slat 7 between the retracted and extended positions 11, 13. In FIG. 7a, the retracted position 11 is illustrated, while in FIG. 7c the extended position 13 is illustrated. In FIG. 7b an intermediate, partly extended position is illustrated.

The drive unit 73 comprises a rotary actuator 75, preferably a geared rotary actuator (GRA), mounted to the main wing 5 and having at least one elongate drive arm 77 in the form of a crank arm rotatably driven about a rotation axis 79 that is fixed at the main wing 5 and drivingly engaging the slat track 17. The drive arm 77 comprises a groove 81 in the form of a slot extending radially with respect to the rotation axis 79, and the slat track 17 comprises a spigot 83 formed as a pin drivingly engaging the groove 81 and extending in parallel to the rotation axis 79. The spigot 83 comprises a spigot roller (not shown) for rolling engagement with the slot. The spigot roller has an axis of rotation aligned with the spigot axis of extension.

The groove 81 defines an inner end position 89 and an outer end position 91 between which the spigot 83 can move in a guided manner when the drive arm 77 is rotated about the rotation axis 79. The inner end position 89 and/or the outer end position 91 might be defined by a hard stop, such as a closed end or a stopper, limiting travel of the spigot 83 mechanically. Alternatively, the inner end position 89 and the outer end position 91 might not be defined by any hard stop but might simply relate to the ends of the travel path of the spigot 83 within the groove 81. In particular, the inner end position 89 might be defined by a hard stop in the form of a closed end of the groove 81, while the outer end position 91 might be defined by an end of the travel path of the spigot 83 within the groove 81, e.g., at the level of the opening of the groove 81, i.e., the end of the lateral guide, without the groove 81 having any hard stop, as shown e.g., in FIGS. 6, 10, 11 and 12. Also, it might be possible that even when there is a hard stop, such as a closed end of the groove 81, as shown in FIGS. 7a-c, 8 and 9, the inner and/or outer end 89, 91 is not defined by the hard stop as the travel path of the spigot 83 within the groove 81 ends before the hard stop. Further, the groove 81 defines a center line 93 which extends from the inner end position 89 to the outer end position 91 and along which the spigot 83 moves between the inner and outer end positions 89, 91.

The groove 81 has a curved form, wherein a distance between the center line 93 and the rotation axis 79 continuously increases from the inner end position 89 towards the outer end position 91. Further, the groove 81 has such a form that a distance between the center line 93 and a first reference line 95 increases continuously and overproportionately from the inner end position 89 towards the outer end position 91. As visible in FIGS. 11 and 12, the first reference line 95 has a straight radial extension from the rotation axis 79 and intersects the inner end position 89 of the groove 81.

Figure 11:
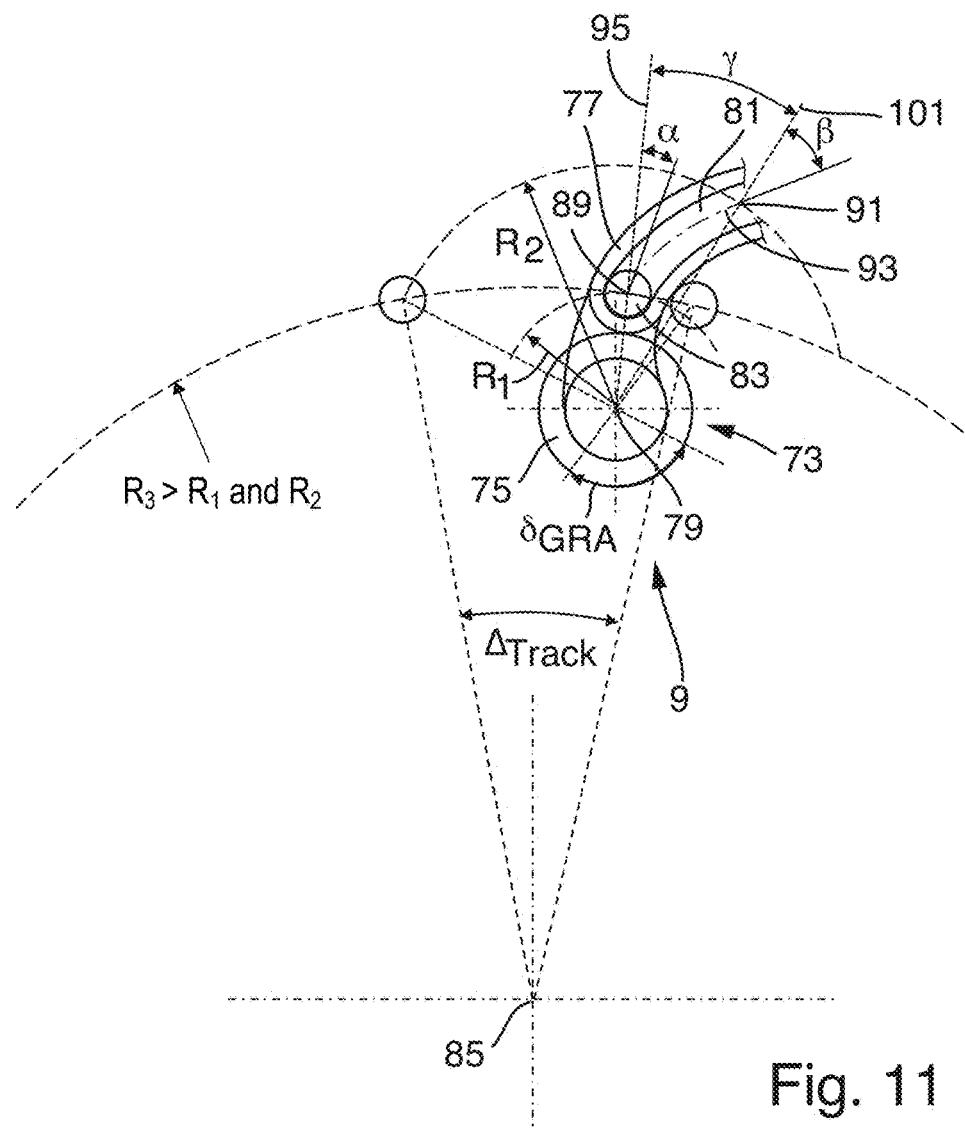
FIG. 11 is a schematic side view of a connection assembly according to another embodiment of the invention.
Figure 12:
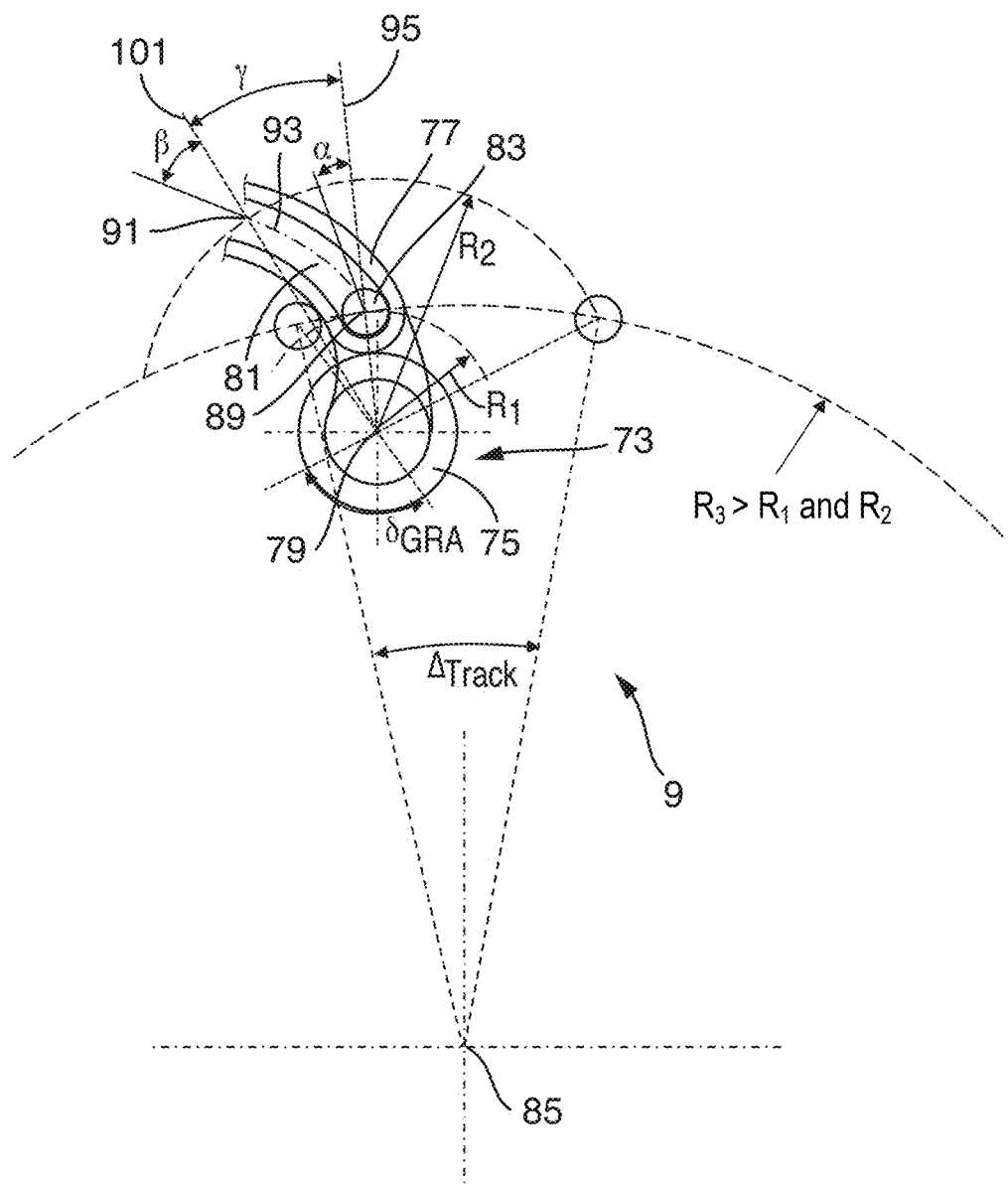
FIG. 12 is a schematic side view of a connection assembly according to another embodiment of the invention.

With reference to the embodiments shown in FIGS. 11 and 12, an angle α between the first reference line 95 and a tangent to the center line 93 at the inner end position 89 is between −30° and 45°, preferably between −10° and 20°, more preferred between −5° and 5°, most preferred around 0°. Further, an angle β between a second reference line 101 and a tangent to the center line 93 at the outer end position 91 is between 45° and 90°, preferably between 30° and 70°, more preferred between 55° and 65°, most preferred around 60°, the second reference line 101 having a straight radial extension from the rotation axis 79 and intersecting the outer end position 91 of the groove 81. An angle γ between the first reference line 95 and the second reference line 101 is between 20° and 90°, preferably between 30° and 70°, more preferred between 40° and 50°, most preferred around 45°.

In the embodiments shown in FIGS. 7a-c, 8, 10 and 11, the groove 81 has a convexly curved form with respect to the slat 7. In this case, the spigot 83 moves from the inner end position 89 towards the outer end position 91, when the drive arm 77 drives the slat track 17 to move the slat 7 from the retracted position 11 towards the extended position 13. Alternatively, in the embodiments shown in FIGS. 6, 9 and 12, the groove 81 has a concavely curved form with respect to the slat 7. In this case, the spigot 83 moves from the outer end position 91 towards the inner end position 89, when the drive arm 77 drives the slat track 17 to move the slat 7 from the retracted position 11 towards the extended position 13.

Figure 8:
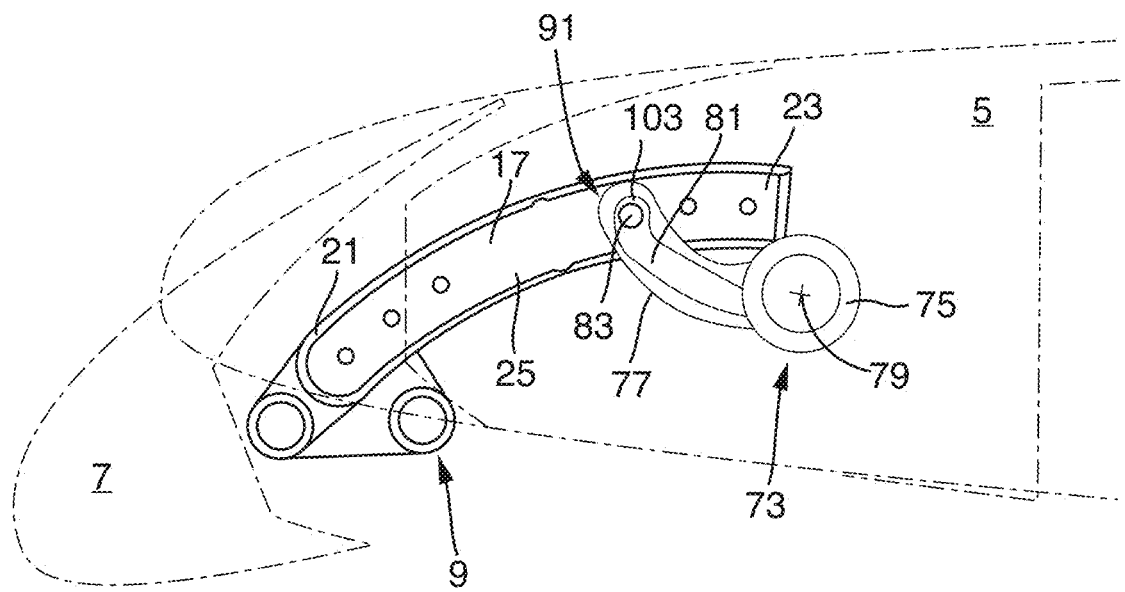
FIG. 8 is a schematic side view of a connection assembly according to another embodiment of the invention.
Figure 9:
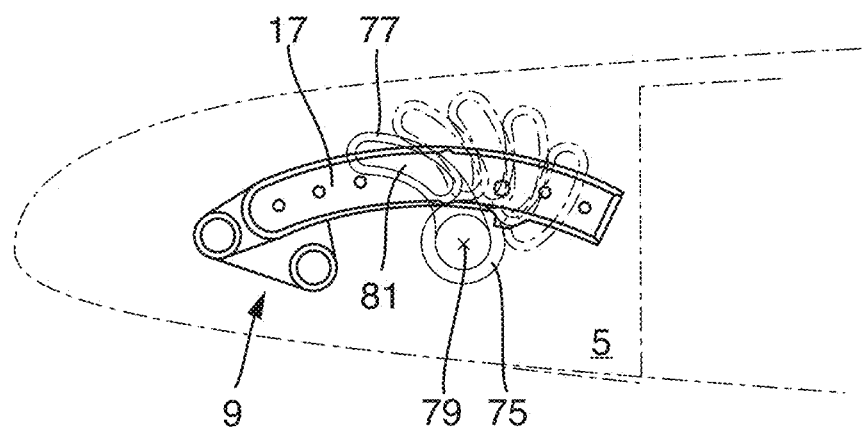
FIG. 9 is a schematic side view of a connection assembly according to another embodiment of the invention.
Figure 10:
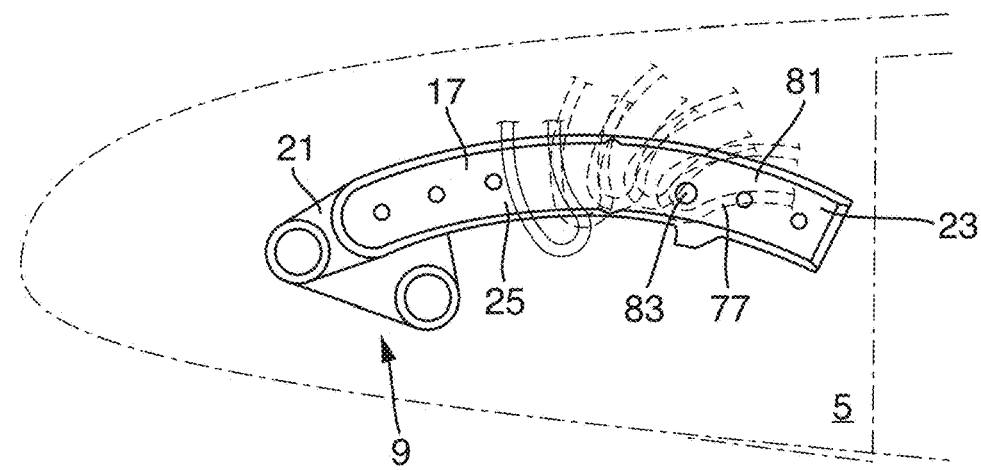
FIG. 10 is a schematic side view of a connection assembly according to another embodiment of the invention.

In the embodiment shown in FIG. 8, the groove 81 has a locking position 103, for the spigot 83 to be temporarily locked, where the curvature essentially differs from the other areas of the groove 81. In this embodiment, the locking position 103 is formed at the outer end position 91.

As shown in FIGS. 6 to 12, the spigot 83 is provided at a lateral side of the slat track 17 at the intermediate portion 25 of slat track 17. The groove 81 is formed in the drive arm 77 and the spigot 83 extends from the lateral surface of slat track 17. Further, the slat track 17 has a curved shape and, when moved along the track longitudinal axis 19 between retracted and extended positions 11, 13 of the slat 7, the slat track 17 is movable along a curved path having an axis of rotation 85, i.e., a center of rotation about which the slat track 17 is moved, spaced in parallel from the rotation axis 79 of the drive arm 77 (see e.g., FIGS. 11 and 12).

In the embodiments shown in FIGS. 7a-c, 8 and 9, the groove 81 is formed as a long hole extending in a radial direction with respect to the rotation axis 79, so that the spigot 83 can move radially within the long hole when the drive arm 77 is rotated to move the slat track 17. Alternatively, in the embodiments shown in FIGS. 6, 10, 11 and 12, the groove 81 is open at an outer end, i.e., a distal end, of the drive arm 77.

By the invention as described before, a wing 3 is provided having a very simple, robust, and cost-efficient drive unit 73 including a very smooth and efficient load transfer, since no high precision gear teeth are involved and assembly tolerances are rather low compared to a rack-and-pinion drive. Also, maintenance efforts can be essentially reduced. Further, different positions of the drive arm 77 are possible and a dual load path design with two drive arms 77 is enabled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing; and
   a slat assembly, comprising:
      a slat; and
      at least one connection assembly movably connecting the slat to the main wing, such that the slat is movable between a retracted position and at least one extended position,
   wherein the connection assembly comprises a slat track that is elongated and extends along a track longitudinal axis between a front end and a rear end and has an intermediate portion between the front and rear ends,
   wherein the front end of the slat track is mounted to the slat,
   wherein at least one of the rear end of the slat track and the intermediate portion of the slat track is mounted to the main wing by a roller or slide bearing such that the slat track is movable along the track longitudinal axis,
   wherein the connection assembly comprises a drive unit configured for driving the slat track for movement along the track longitudinal axis,
   wherein the drive unit comprises a rotary actuator mounted to the main wing and having a drive arm rotatably driven about a rotation axis and drivingly engaging the slat track,
   wherein the drive arm comprises at least one groove and the slat track comprises at least one spigot drivingly engaging the groove,
   wherein the groove defines an inner end position and an outer end position between which the spigot is movable in a guided manner when the drive arm is rotated about the rotation axis,
   wherein the groove defines a center line extending from the inner end position to the outer end position,
   wherein the groove has a curved form, wherein a distance between the center line and the rotation axis increases from the inner end position towards the outer end position, and
   wherein the groove has such a form that a distance between the center line and a first reference line increases continuously and overproportionately from the inner end position towards the outer end position, the first reference line having a straight radial extension from the rotation axis and intersecting the inner end position of the groove.

2. The wing according to claim 1, wherein an angle α between the first reference line and a tangent to the center line at the inner end position is between −30° and 45°.

3. The wing according to claim 2, wherein the angle α between the first reference line and the tangent to the center line at the inner end position is between −10° and 20°.

4. The wing according to claim 1, wherein an angle β between a second reference line and the tangent to the center line at the outer end position is between 20° and 90°, the second reference line having a straight radial extension from the rotation axis and intersecting the outer end position of the groove.

5. The wing according to claim 4, wherein the angle β between the second reference line and the tangent to the center line at the outer end position is between 30° and 70°.

6. The wing according to claim 4, wherein an angle γ between the first reference line and the second reference line is between 20° and 90°.

7. The wing according to claim 6, wherein the angle γ between the first reference line and the second reference line is between 30° and 70°.

8. The wing according to claim 1, wherein the groove has a convexly curved form with respect to the slat.

9. The wing according to claim 1, wherein the groove has a concavely curved form with respect to the slat.

10. The wing according to claim 1, wherein the groove has one or more locking positions where the curvature differs from other areas of the groove.

11. The wing according to claim 10, wherein a locking position is formed at at least one of the inner end position and the outer end position.

12. The wing according to claim 1, wherein the spigot comprises a spigot roller for rolling engagement with a slot.

13. The wing according to claim 1, wherein the spigot or the groove is provided at a lateral side of the slat track at the intermediate portion of slat track.

14. The wing according to claim 1, wherein the groove is open at an outer end of the drive arm.

15. The wing according to claim 1, wherein the roller or slide bearing comprises a guide rail mounted to the main wing and a first roller unit mounted to the rear end of the slat track and engaging the guide rail,
wherein the roller or slide bearing comprises a second roller unit that is mounted to the main wing and that engages an engagement surface provided at the intermediate portion of the slat track,
wherein the slat track has a profile comprising an upper flange portion, a lower flange portion and at least one web portion connecting the upper and lower flange portions,
wherein the second roller unit is arranged in at least one recess between the upper and lower flange portions and engages the engagement surface provided at at least one of the upper flange portion and the lower flange portion,
wherein the slat track has such a profile that a first recess of the at least one recess is formed between the upper and lower flange portions at a first side of the web portion, and a second recess of the at least one recess is formed between the upper and lower flange portions at a second side of the web portion opposite the first side,
wherein the second roller unit comprises a first roller element and a second roller element,
wherein the first roller element is arranged in the first recess and the second roller element is arranged in the second recess,
wherein the first and second roller elements are arranged coaxially and have the same radius, and
wherein the groove or the spigot is arranged in the web portion.

16. A slat assembly, comprising:
a slat; and
at least one connection assembly for movably connecting the slat to a main wing for an aircraft, the connection assembly comprising:
an elongate slat track that extends along a track longitudinal axis between a front end and a rear end and has an intermediate portion between the front and rear ends,
wherein the front end of the slat track is configured to be mounted to the slat,
wherein at least one of the rear end of the slat track and the intermediate portion of the slat track is configured to be mounted to the main wing by a roller or slide bearing such that the slat track is movable along the track longitudinal axis,
wherein the connection assembly comprises a drive unit configured for driving the slat track for movement along the track longitudinal axis,
wherein the drive unit comprises a rotary actuator configured to be mounted to the main wing and having a drive arm rotatably driven about a rotation axis and drivingly engaging the slat track,
wherein the drive arm comprises at least one groove and the slat track comprises at least one spigot drivingly engaging the groove,
wherein the groove defines an inner end position and an outer end position between which the spigot is movable in a guided manner when the drive arm is rotated about the rotation axis,
wherein the groove defines a center line extending from the inner end position to the outer end position,
wherein the groove has a curved form, wherein a distance between the center line and the rotation axis increases from the inner end position towards the outer end position, and
wherein the groove has such a form that a distance between the center line and a first reference line increases continuously and overproportionately from the inner end position towards the outer end position, the first reference line having a straight radial extension from the rotation axis and intersecting the inner end position of the groove.

17. An aircraft comprising a wing according to claim 1.

18. An aircraft comprising a slat assembly according to claim 16.

* * * * *